US012769689B2

(12) United States Patent
Tian

(10) Patent No.: US 12,769,689 B2
(45) Date of Patent: Oct. 20, 2026

(54) SERVER AND SERVER MANAGEMENT SYSTEM THEREFOR

(71) Applicant: SUZHOU METABRAIN INTELLIGENT TECHNOLOGY CO., LTD., Suzhou (CN)

(72) Inventor: Shuo Tian, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 194 days.

(21) Appl. No.: 18/723,062

(22) PCT Filed: Apr. 27, 2023

(86) PCT No.: PCT/CN2023/091301
§ 371 (c)(1),
(2) Date: Jun. 21, 2024

(87) PCT Pub. No.: WO2023/208135
PCT Pub. Date: Nov. 2, 2023

(65) Prior Publication Data

US 2025/0053536 A1 Feb. 13, 2025

(30) Foreign Application Priority Data

Apr. 29, 2022 (CN) ......................... 202210466930.0

(51) Int. Cl.
*G06F 13/40* (2006.01)
*G06F 9/4401* (2018.01)
(Continued)

(52) U.S. Cl.
CPC ........ *G06F 13/4022* (2013.01); *G06F 9/4405* (2013.01); *G06F 13/382* (2013.01);
(Continued)

(58) Field of Classification Search
CPC .... G06F 9/4405; G06F 13/382; G06F 13/385; G06F 13/4022; G06F 13/4027;
(Continued)

(56) References Cited

U.S. PATENT DOCUMENTS

| | | | | |
|---|---|---|---|---|
| 10,127,170 | B2 * | 11/2018 | Lai | G06F 13/382 |
| 2014/0344431 | A1 * | 11/2014 | Hsu | H04L 41/0213 709/223 |

(Continued)

FOREIGN PATENT DOCUMENTS

| | | | |
|---|---|---|---|
| CN | 109992555 | A | 7/2019 |
| CN | 110908475 | A | 3/2020 |

(Continued)

OTHER PUBLICATIONS

JP2024-539515 Notice of Reasons for Refusal dated May 22, 2025.

*Primary Examiner* — Thomas J. Cleary
(74) *Attorney, Agent, or Firm* — IPro, PLLC

(57) ABSTRACT

A server and a server management system therefor, relating to the field of servers. The server management system is used for managing a server. The server management system may assist two CPUs to start, and may receive PCIe signals sent by the two CPUs, so as to display an operating system interface. The server management system may also send a received keyboard and mouse instruction to a CPU currently in communication with a gating switch (3) by means of a USB controller (2), thereby implementing use of the keyboard and mouse. Moreover, when the USB controller (2) performs mutual conversion between a USB signal and a PCIe signal, communication with the CPU currently in communication with the gating switch (3) may be implemented by means of a first USB interface (4).

20 Claims, 2 Drawing Sheets

(51) Int. Cl.
*G06F 13/38* (2006.01)
*G06F 13/42* (2006.01)

(52) U.S. Cl.
CPC ........ *G06F 13/387* (2013.01); *G06F 13/4027* (2013.01); *G06F 13/4068* (2013.01); *G06F 13/4221* (2013.01); *G06F 13/4282* (2013.01); *G06F 2213/0026* (2013.01); *G06F 2213/0042* (2013.01)

(58) Field of Classification Search
CPC ............. G06F 13/4221; G06F 13/4282; G06F 21/575; G06F 13/387
See application file for complete search history.

(56) References Cited

U.S. PATENT DOCUMENTS

| | | | | |
|---|---|---|---|---|
| 2019/0079887 A1* | 3/2019 | Itkin | ........................ | H04L 41/04 |
| 2021/0374084 A1* | 12/2021 | Liang | ........................ | G06F 21/31 |
| 2022/0365676 A1* | 11/2022 | Nguyen | ................ | G06F 3/0683 |
| 2023/0251988 A1* | 8/2023 | Thien | .................. | G06F 13/4022 710/316 |

FOREIGN PATENT DOCUMENTS

| | | | | | |
|---|---|---|---|---|---|
| CN | 113608934 | A | * | 11/2021 | .......... G06F 11/2038 |
| CN | 114721992 | A | | 7/2022 | |
| CN | 115426237 | B | * | 9/2024 | ......... G06F 13/4282 |
| JP | 2019046148 | A | | 3/2019 | |
| WO | 2022083204 | A1 | | 4/2022 | |

* cited by examiner

--Prior Art--

SERVER AND SERVER MANAGEMENT SYSTEM THEREFOR

CROSS REFERENCE TO RELATED APPLICATION

The present application claims the priority of the Chinese patent application 202210466930.0 titled "SERVER AND SERVER MANAGEMENT SYSTEM THEREFOR" filed in China National Intellectual Property Administration on Apr. 29, 2022, which is incorporated herein by reference in their entirety.

TECHNICAL FIELD

The present disclosure relates to the field of servers, and in particular to a server management system and a server.

BACKGROUND

In the past, the server management unit has been included in the server mainboard. Modularizing the server management unit and separating it from the mainboard of the server have obvious advantages. With the continuous updating and iteration of CPU technology for the server, server applications are constantly being innovated. In the future, the integration of the central processing unit (CPU) Southbridge chip and the CPU will result in the removal of low-speed interfaces such as the universal serial bus (USB). The CPU partitioning application enables two CPUs to run the operating system separately. For the new CPU design, there is a lack of a mature server management system in the conventional technology.

SUMMARY

The objective of the present application is to provide a server management system. The server management system in the present application may be applied to a future solution of the CPU partitioning application without the USB interface, and has a simple structure and strong stability. Another objective of the present application is to provide a server including the above server management system. The server management system in the present application may be applied to a future solution of the CPU partitioning application without the USB interface, and has a simple structure and strong stability.

In order to solve the above technical problem, the present application provides a server management system, including:

- a baseboard management control apparatus configured for receiving a peripheral component interconnect express (PCIe) signal sent by a CPU through a gating switch, sending a keyboard and mouse instruction received through a first USB interface to a CPU connected to the gating switch. Connected CPU, and assisting the CPU connected to the gating switch in startup;
- a USB controller connected to the baseboard management control apparatus and configured for performing mutual conversion between a USB signal and a PCIe signal, so that communication between the CPU connected to the gating switch and the first USB interface is 5 implemented;
- a gating switch connected to two CPUs of a server, the baseboard management control apparatus and the USB controller respectively, and configured for connecting a set of PCIe signals of a designated CPU of the two CPUs to the baseboard management control apparatus and connecting the other set of PCIe signals to the USB controller; and
- the first USB interface connected to the baseboard management control apparatus and the USB controller respectively.

In some embodiments, the baseboard management control apparatus includes:

- a baseboard management controller (BMC) connected to an enhanced serial peripheral interface (ESPI) of one of the CPUs and configured for receiving the PCIe signal sent by the CPU through the gating switch, sending the keyboard and mouse instruction received through the first USB interface to the CPU connected to the gating switch, and receiving startup information sent by one of the CPUs through its own ESPI interface;
- a control module connected to the BMC, an ESPI interface of the other CPU and the gating switch respectively, and configured for processing the startup information sent by the other CPU through the ESPI interface by using a preset program, and controlling a state of the gating switch; and
- a trusted root security management apparatus connected to the two CPUs and the BMC respectively, and configured for providing a verified startup program for the CPU and the BMC during a power-on phase of the server.

In some embodiments, the control module is further connected to a low voltage differential signaling (LVDS) interface of a mainboard:

- the control module is further configured for decoupling an LVDS signal coupled from a plurality of designated types of low-speed signals sent by the mainboard and sending it to the BMC, and decoupling an LDVS signal coupled from a plurality of designated types of low-speed signals sent by the BMC and sending it to the mainboard.

In some embodiments, the server management system further includes:

- a protocol conversion apparatus connected to a universal asynchronous receiver/transmitter (UART) interface of the BMC and configured for performing conversion between a USB protocol and a UART protocol;
- a second USB interface connected to the protocol conversion apparatus; and
- the BMC further configured for outputting a UART signal received from the control module from the UART interface, and sending the UART signal sent by the protocol conversion apparatus to the control module.

In some embodiments, the control module is further connected to an improved inter integrated circuit (I3C) interface of the CPU; and

- the control module is further configured for:
- connecting an I3C signal of the CPU to the BMC, so that the BMC debugs the CPU through the I3C signal.

In some embodiments, the gating switch includes:

- a first one-out-of-two PCIe switch with a first terminal connected to first PCIe signal channels of the two CPUs respectively and a second terminal connected to the USB controller, configured for connecting a first PCIe signal of one of the two CPUs to the USB controller under control of the control module;
- a second one-out-of-two PCIe switch with a first terminal connected to second PCIe signal channels of the two CPUs respectively and a second terminal connected to the BMC, configured for connecting a second PCIe signal of one of the two CPUs under the control of the control module; and a two-out-of-two switch with a first terminal connected to clock signals of the two CPUs respectively and a second terminal connected to the USB controller and the BMC respectively, configured for sending the clock signals of the two CPUs to the USB controller and the BMC respectively.

In some embodiments, the server management system further includes a third USB interface connected to the USB controller; and the USB controller is configured for performing mutual conversion between the USB signal and the PCIe signal, so that communication between the CPU connected to the gating switch and the first USB interface and the third USB interface respectively is implemented.

In some embodiments, the control module is a field programmable gate array (FPGA).

In some embodiments, the trusted root security management apparatus includes:

a trusted root security management module Cerberus, connected to two CPUs and the BMC respectively, and configured for providing a verified startup program for the CPUs and the BMC during a power-on phase of the server;

a first CPU Flash configured for storing a startup program of one of the CPUs;

a second CPU Flash configured for storing a startup program of the other CPU; and a BMC Flash configured for storing a startup program of the BMC.

In order to solve the above technical problem, the present application also provides a server including the above server management system.

The present application provides a server management system. The server management system in the present application may assist two CPUs in startup, may receive PCIe signals sent by the two CPUs for display of the operating system interface, and may also send the received keyboard and mouse instruction to the CPU connected to the gating switch through the USB controller, thereby realizing the keyboard and mouse application. When the USB controller performs mutual conversion between the USB signal and the PCIe signal, the communication between the CPUs connected to the gating switch is implemented through the first USB interface. It may be seen that the present application may be applied to a future solution of CPU partitioning application in which the USB interface is removed, and has a simple structure and strong stability.

The present application also provides a server, which has the same beneficial effects as the above server management system.

BRIEF DESCRIPTION OF THE DRAWINGS

In order to more clearly illustrate the technical solutions of the embodiments of the present disclosure or the prior art, the figures that are required to describe the embodiments or the prior art may be briefly introduced below: Apparently, the figures that are described below are embodiments of the present disclosure, and a person skilled in the art may obtain other 20) figures according to these figures without paying creative work.

DEEMPENNAGEED DESCRIPTION OF THE EMBODIMENTS

The core of the present application is to provide a server management system. The server management system in the present application may be applied to a future solution for the CPU partitioning application without the USB interface. It has a simple structure and strong stability. Another core of the present application is to provide a server including the above server management system. The server management system in the present application may be applied to a future solution for the CPU partitioning application without the USB interface. It has a simple structure and strong stability.

In order to make the objects, the technical solutions and the advantages of the embodiments of the present disclosure clearer, the technical solutions of the embodiments of the present disclosure may be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

Figure 1:
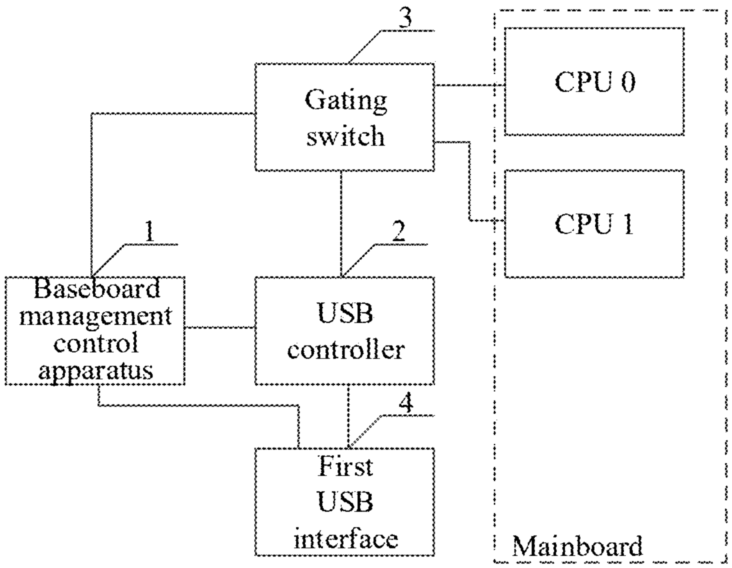
FIG. 1 is a schematic structure diagram of a server management system provided in some embodiments of the present application.

Referring to FIG. 1. FIG. 1 is a schematic structure diagram of a server management 10) system provided in some embodiments of the present application. The server management system includes:

a baseboard management control apparatus 1 configured for receiving a PCIe signal sent by a CPU through a gating switch 3, sending a keyboard and mouse instruction received through a first USB interface 4 to the CPU connected to the gating switch 3, and assisting the CPU connected to the gating switch 3 in startup;

a USB controller 2 connected to the baseboard management control apparatus 1 and configured for performing mutual conversion between a USB signal and the PCIe signal, so that communication between the CPU connected to the gating switch 3 and the first USB interface 4 is implemented;

a gating switch 3 connected to two CPUs of a server, the baseboard management control apparatus 1 and the USB controller 2 respectively and configured for connecting one set of PCIe signals of a designated CPU of the two CPUs to the baseboard management control apparatus 1 and connecting the other set of PCIe signals to the USB controller 2; and the first USB interface 4 configured for connecting to the baseboard management control apparatus 1 and the USB controller 2 respectively.

Figure 2:
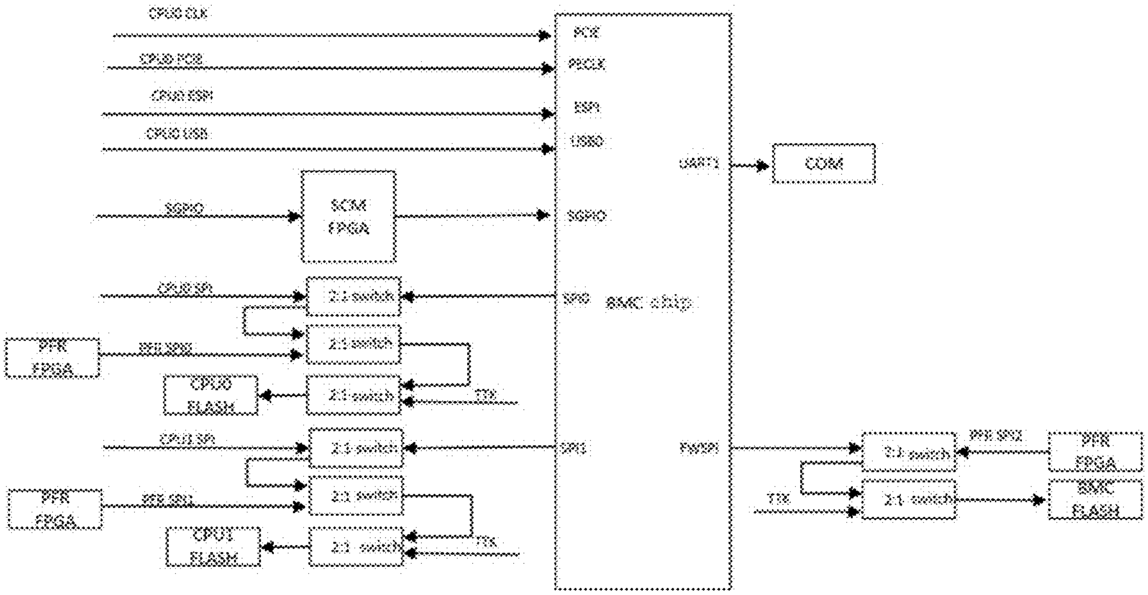
FIG. 2 is a schematic structure diagram of an existing server management system.

Refer to FIG. 2. FIG. 2 is a schematic structure diagram of an existing server management system. The existing 2-way universal server mainboard includes two CPUs. CPU0 and CPU1. Only CPU0 is required to complete separate startup and run the operating system, and CPU1 is mostly configured for extending computing and PCIe resources without running the operating system. CPU1 is booted by CPU0 to complete the startup. The BMC chip is involved in the startup process of CPU0. The PCIe bus of CPU0 is connected to the PCIe controller of the BMC chip for display output of the operating system interface. The ESPI bus of the CPU (Southbridge chip is connected to the BMC chip to transmit serial port information of CPU0. The USB bus of the CPU0 Southbridge chip is connected to the BMC chip to implement keyboard and mouse applications, etc. The UART interface of the BMC chip is externally connected to a serial COM connector to output serial port information. The BMC is connected to the FPGA through a serial general-purpose input/output (SGPIO) bus, and is connected to the SGPIO bus of the mainboard through the FPGA in this module to implement the IO (Input/Output) interface extension function. The platform firmware resilience (PFR) is a widely used secure boot technology, and is mainly implemented by the FPGA. During the initial power-on stage, the PFR FPGA checks the CPU FLASH. BMC FLASH and other storage units to determine whether the system is in a bootable state. In the existing solution, because CPU0. CPU1 and BMC chips are required to connect to the FLASH, a large number of 2-out-of-1-out logic switches are required for channel gating. In the current PFR solution, the introduction of multiple logic switches greatly increases link branches, thereby resulting in signal integrity risks. The PFR check logic program is redundant and difficult to develop, thereby resulting in a long production and burning time, and greatly reducing production efficiency.

At present. CPU products are updated and iterated rapidly. In the future, the CPU Southbridge chip will be integrated with the CPU, which results in the removal of low-speed interfaces such as the USB. The existing USB solution may not be adapted to a new generation of CPUs. With the increasing demand for reliable operations of low-energy consumption applications in the data center, the concept of CPU partitioning application has been proposed. However, the existing server management solution does not support the CPU partitioning application. The CPU partition application enables two CPUs to run the system separately, and has the following advantages:

1. Meeting the multi-system requirement of the user;
2. 1+1 backup of the operating system. When one way fails, the system may quickly switch to another way;
3. Improving resource utilization. When the user configuration in a single system is not high, the original 2-way server running a single system will cause a waste of the CPU1 resources.

The PFR technology mainly relies on complex logic, and the PFR circuit signal integrity risk is high. These characteristics greatly increase the difficulty of development, production and maintenance. Existing servers may only remotely debug the CPU through the cluster communication port (COM) port or the BMC.

Considering the technical problem in the Background, for the new CPU design (the integration of CPU Southbridge chip and the CPU results in the removal of low-speed interfaces such as the USB, and the CPU partitioning application enables two CPUs to run the operating system separately), since the new generation of CPUs no longer have USB interfaces, the two CPUs (CPU0, CPU1) of the server each have two PCIe buses connected to the new server management system. The gating switch 3 uniformly controls a total of four channels of PCIe buses of the two CPUs. The gating switch 3 may connect two PCIe buses of the currently operating CPU to the baseboard management control apparatus 1 and the USB controller respectively.

When the CPU0 is operating, the gating switch 3 may connect the two PCIe buses of the CPU0 to the baseboard management control apparatus 1 and the USB controller respectively. The CPU may send the PCIe signal through the PCIe bus connected to the baseboard management control apparatus 1. For example, it may send data related to the operating system interface, so that the baseboard management control apparatus 1 may perform display control of the operating system interface, and the USB controller 2 connected to the first USB interface 4 may perform mutual conversion between the USB signal and the PCIe signal. In this way, the first USB interface 4 may perform USB communication with the CPU connected to the gating switch 3 through the USB controller 2.

In order to realize the keyboard and mouse functions of the server, the signals of the keyboard and mouse devices may be sent to the baseboard management control apparatus 1 through the first USB interface 4. After processing the keyboard and mouse instructions, the baseboard management control apparatus 1 may send the keyboard and mouse instructions to the CPU connected to gating switch 3 through the USB controller 2 and the gating switch 3, so as to realize the keyboard and mouse application.

In some embodiments, the baseboard management control apparatus 1 may also assist the CPU connected to the gating switch 3 in startup, which includes providing a verified startup program for the CPU during the startup phase of the server, and receiving startup information sent by the CPU.

Due to the presence of the gating switch 3, the server management system in some embodiments of the present application may also be compatible with existing CPUs, and has strong compatibility and versatility.

Some embodiments of the present application provide a server management system. The server management system may assist two CPUs in startup, and may receive the PCIe signals sent by two CPUs for the display of the operating system interface. It may also send the received keyboard and mouse commands to the CPU connected to the gating switch through the USB controller, so as to realize the keyboard and mouse application. When the USB controller performs mutual conversion between the USB signal and the PCIe signal, the communication between the CPUs connected to the gating switch may be implemented through the first USB interface. The server management system may be applied to a future solution of the CPU partitioning applications without the USB interface, and has a simple structure and strong stability.

Figure 3:
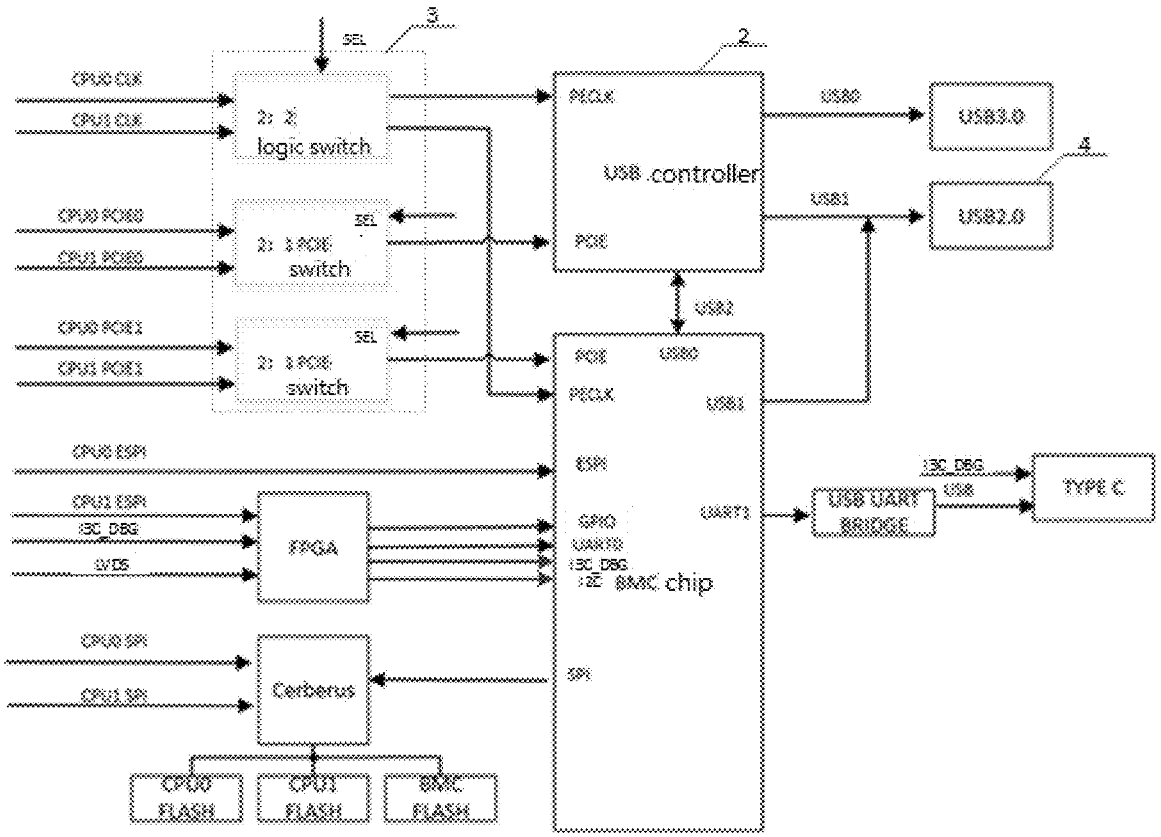
FIG. 3 is a schematic structure diagram of another server management system provided in some embodiments of the present application.

In order to better introduce the embodiments of the present application, please refer to FIG. 3. FIG. 3 is a schematic structure diagram of another server management system provided in some embodiments of the present application. Based on the above embodiments:

in some embodiments, the baseboard management control apparatus 1 includes:

a baseboard management controller BMC connected to the ESPI interface of one of the CPUs and configured for receiving the PCIe signal sent by the CPU through the gating switch 3, sending the keyboard and mouse instruction received through the first USB interface 4 to the CPU connected to the gating switch 3, and receiving startup information sent by one of the CPUs through its own ESPI interface;

a control module connected to the BMC, the ESPI interface of the other CPU and the gating switch 3 respectively, and configured for processing the startup information sent by the other CPU through the ESPI interface by using a preset program, and controlling a state of the gating switch 3; and a trusted root security management apparatus connected to the two CPUs and the BMC respectively, and is configured for providing a verified startup program for the CPU and the BMC during the power-on phase of the server.

The composition of the BMC, the control module and the trusted root security management module has the advantages of simple structure, low cost and strong stability.

Of course, in addition to the above composition, the baseboard management control apparatus 1 may also be of other compositions.

Considering the existing 2-way server, the CPU0 transmits UART information to the BMC through the ESPI bus and outputs it through the COM interface of the BMC. The ESPI bus speed is high, and the UART bus speed is low. Transmitting UART information by the ESPI greatly reduces the utilization of the ESPI bus. The new server management system has been improved to support the CPU partitioning application. The ESPI mainly runs CPU startup information to improve the efficiency of CPU startup. Since the BMC chip only supports one ESPI interface, in the present application, the ESPI of one of the CPUs (CPU0) may be connected to the ESPI interface of BMC to participate in the startup of the CPU0, and the ESPI of the CPU1 may be connected to the control module to participate in the independent startup of the CPU1 through the control module.

In addition, the control module may also control the state of the gating switch 3. The control module may control the state of the gating switch 3 based on the instruction sent by the BMC.

In some embodiments, the control module is also connected to the LVDS interface of the mainboard.

The control module is also configured for decoupling a low-voltage differential signaling (LVDS) signal coupled from a plurality of designated types of low-speed signals sent by the mainboard and sending it to the BMC, and decoupling an LVDS signal coupled from a plurality of specified types of low-speed signals sent by the BMC and sending it to the mainland.

Due to the introduction of the PCIe bus and ESPI bus of the CPU, the interface between the BMC and the mainboard is inevitably tense. Some low-speed signals, such as I2C. UART and GPIO signals, between the BMC and the mainboard may be logically coupled to the LVDS bus for transmission, and then decoupled through the control module on the mainboard side. Thus, the information interaction between the BMC module and the mainboard is completed by the LVDS bus, which may improve the signal transmission rate and reduce the number of signals for the BMC-mainboard interface.

In some embodiments, the server management system further includes:

a protocol conversion apparatus connected to the UART interface of the BMC and configured for performing conversion between the USB protocol and the UART protocol; and a second USB interface connected to the protocol conversion apparatus.

The BMC is further configured for outputting the UART signal received from the control module through the UART interface and sending the UART signal sent by the protocol conversion apparatus to the control module.

In the server management system of some embodiments of the present application, the UART signal logically decoupled from the control module is output through the UART interface of the BMC, connected to the second USB interface through the protocol conversion apparatus (UART-to-USB chip, USB UART BRIDGE in FIG. 3), and communicated with the UART signal on the mainboard through the second USB interface.

In some embodiments, the control module is also connected to an I3C interface of the CPU.

The control module is configured for:

connecting an I3C signal of the CPU to the BMC so that the BMC may debug the CPU through the I3C signal.

In order to enable the BMC to debug the CPU through the I3C signal, the control module is also connected to the I3C interface of the CPU, and the control module may connect the I3C signal of the CPU to the BMC, so that the BMC may debug the CPU through the I3C signal.

In addition, it is worth mentioning that the I3C signal of the CPU may also be directly connected to the second USB interface (in this case, the second USB interface may be a TYPEC connector). The serial port information may be debugged through the TYPEC interface, and the CPU may also be debugged through the I3C signal, which improve testing efficiency.

In some embodiments, the gating switch 3 includes:

a first 1-out-of-2 PCIe switch with a first terminal connected to first PCIe signal channels of two CPUs respectively and a second terminal connected to the USB controller 2, configured for connecting a first PCIe signal of one of the two CPUs to the USB controller 2 under the control of the control module.

a second 1-out-of-2 PCIe switch with a first terminal connected to second PCIe signal channels of two CPUs respectively and a second terminal connected to the BMC, configured for connecting a second PCIe signal of one of the two CPUs to the BMC under the control of the control module.

a 2-out-of-2 logic switch, with a first terminal connected to clock signals of two CPUs respectively and a second terminal connected to the USB controller 2 and the BMC respectively, configured for sending the clock signals of the two CPUs to the USB controller 2 and the BMC respectively.

In some embodiments of the present application, the gating switch 3 includes two 1-out-of-2 PCIe switches and one 2-out-of-2 logic switch, which has a simple structure and low cost.

Of course, the gating switch 3 may also be of other structures.

In some embodiments, the server management system further includes a third USB interface connected to the USB controller 2.

The USB controller 2 is configured for performing mutual conversion between the USB signal and the PCIe signal, so as to achieve communication between the CPU connected to the gating switch 3 and the first USB interface 4 and the third USB interface respectively.

Considering that in addition to the keyboard and mouse, the server is also required to connect to more USB devices. Therefore, a plurality of USB interfaces may be provided. The first USB interface 4 may be an interface of USB2.0 protocol, and the third USB interface May be an interface of USB3.0 or higher protocol, so as to improve user experience.

In some embodiments, the control module is an FPGA.

The FPGA has the advantages of small size, high performance and low cost.

Of course, in addition to the FPGA, the control module may also be of other types.

In some embodiments, the trusted root security management apparatus includes:

a trusted root security management module Cerberus connected to two CPUs and the BMC respectively and configured for providing a verified startup program for the CPUs and the BMC during the power-on phase of the server;

a first CPU Flash configured for storing a startup program of one of the CPUs;

a second CPU Flash configured for storing a startup program of the other CPU;

a BMC Flash configured for storing a startup program of the BMC.

Cerberus is an ARM processing-based trusted root security management module, provides multiple SPI interfaces externally, and may complete the check and recovery of the CPU, the BMC and other chips during the power-on phase of the server. The Cerberus solution avoids the stacking of logic switches in the PFR solution and reduces the difficulty of PCB design, and also greatly reduces the difficulty of logic development and improves production efficiency.

Of course, in addition to the above structure, the trust root security management apparatus may also be of other types.

In some embodiments, the present application also provides a server including the server management system in the above embodiments.

For an introduction to the server provided in some embodiments of the present application, please refer to the above embodiments of the server management system.

Each embodiment in this specification is described in a progressive manner, each embodiment focuses on the difference from other embodiments, and the same and similar parts of each embodiment may be referred to each other. It should also be noted that relational terms herein such as first and second, etc., are used merely to distinguish one entity or operation from another entity or operation, and do not necessarily require or imply there is any such relationship or order between these entities or operations. Furthermore, the terms "including". "comprising" or any variations thereof are intended to embrace a non-exclusive inclusion, such that a process, method, article, or terminal device including a plurality of elements includes not only those elements but also includes other elements not expressly listed, or also includes elements inherent to such a process, method, article, or device. In the absence of further limitation, an element defined by the phrase "including a . . . " does not exclude the presence of additional identical element in the process, method, article, or terminal device.

The above description of the disclosed embodiments enables those skilled in the art to implement or use the present application. Various modifications to these embodiments will be readily apparent to those skilled in the art, and the general principles defined herein may be implemented in other embodiments without departing from the spirit or scope of the application. Therefore, the present application will not be limited to the embodiments shown herein, but is to conform to the widest scope consistent with the principles and novel features disclosed herein.

The invention claimed is:

1. A server management system, comprising:

a baseboard management control apparatus configured for receiving two sets of PCIe signals sent by one of two CPUs through a gating switch, sending a keyboard and mouse instruction received through a first USB interface to the one of the CPUs connected to the gating switch, and assisting the one of the CPUs connected to the gating switch in startup;

a USB controller connected to the baseboard management control apparatus and configured for performing mutual conversion between a USB signal and a PCIe signal of the two sets of PCIe signals, so that communication between the one of the CPUs connected to the gating switch and the first USB interface is implemented;

the two CPUs being two CPUs of a server, the gating switch connected to the two CPUs of the server, the baseboard management control apparatus and the USB controller respectively, and configured for connecting, at the same time, a first set of the PCIe signals of a designated CPU of the two CPUs to the baseboard management control apparatus and connecting a second set of PCIe signals of the designated CPU of the two CPUs to the USB controller; and the first USB interface connected to the baseboard management control apparatus and the USB controller respectively.

2. The system according to claim 1, wherein the baseboard management control apparatus comprises:

a baseboard management controller BMC connected to an enhanced serial peripheral interface (ESPI interface) of one of the CPUs and configured for receiving the set of PCIe signals sent by the one of the CPUs through the gating switch, sending the keyboard and mouse instruction received through the first USB interface to the one of the CPUs connected to the gating switch, and receiving startup information sent by one of the CPUs through its own ESPI interface;

a control module connected to the BMC, an ESPI interface of the other CPU and the gating switch respectively, and configured for processing the startup information sent by the other CPU through the ESPI interface by using a preset program, and controlling a state of the gating switch; and a trusted root security management apparatus connected to the two CPUs and the BMC respectively, and configured for providing a verified startup program for the one of the CPUs and the BMC during a power-on phase of the server.

3. The system according to claim 2, wherein the control module is further connected to a low voltage differential signal LVDS interface of a mainboard;

the control module is further configured for decoupling an LVDS signal coupled from a plurality of designated types of low-speed signals sent by the mainboard and sending it to the BMC, and decoupling an LDVS signal coupled from a plurality of designated types of low-speed signals sent by the BMC and sending it to the mainboard.

4. The system according to claim 3, wherein the server management system further comprises:

a protocol conversion apparatus connected to a universal asynchronous receiver/transmitter UART interface of the BMC and configured for performing conversion between a USB protocol and a UART protocol;

a second USB interface connected to the protocol conversion apparatus; and the BMC further configured for outputting a UART signal received from the control module from the UART interface, and sending a UART signal sent by the protocol conversion apparatus to the control module.

5. The system according to claim 4, wherein the control module is further connected to an I3C interface of the one of the CPUs; and the control module is further configured for:

connecting an improved inter integrated circuit I3C signal of the one of the CPUs to the BMC, so that the BMC debugs the one of the CPUs through the I3C signal.

6. The system according to claim 5, wherein the control module is further configured for directly connecting an I3C signal of a CPU of the two CPUs of the server to the second USB interface which is a TYPEC connector.

7. The system according to claim 3, wherein the control module is a field programmable logic gate array (FPGA).

8. The system according to claim 2, wherein the gating switch comprises:

a first one-out-of-two PCIe switch with a first terminal connected to first PCIe signal channels of the two CPUs respectively and a second terminal connected to the USB controller, configured for connecting a first PCIe signal of one of the two CPUs to the USB controller under control of the control module;

a second one-out-of-two PCIe switch with a first terminal connected to second PCIe signal channels of the two CPUs respectively and a second terminal connected to the BMC, configured for connecting a second PCIe signal of one of the two CPUs under the control of the control module; and a two-out-of-two switch with a first terminal connected to clock signals of the two CPUs respectively and a second terminal connected to the USB controller and the BMC respectively, configured for sending the clock signals of the two CPUs to the USB controller and the BMC respectively.

9. The system according to claim 2, wherein the server management system further comprises a third USB interface connected to the USB controller; and the USB controller is configured for performing mutual conversion between the USB signal and the PCIe signal, so that communication between the one of the CPUs connected to the gating switch and the first USB interface and the third USB interface respectively is implemented.

10. The system according to claim 9, wherein the third USB interface is an interface of a USB3.0 protocol.

11. The system according to claim 2, wherein the trusted root security management apparatus comprises:

a trusted root security management module Cerberus, connected to the two CPUs of the server and the BMC respectively, and configured for providing a verified startup program for the CPUs and the BMC during a power-on phase of the server;

a first CPU Flash configured for storing a startup program of one of the CPUs;

a second CPU Flash configured for storing a startup program of the other CPU; and a BMC Flash configured for storing a startup program of the BMC.

12. The system according to claim 2, wherein the control module is configured for controlling a state of the gating switch based on an instruction sent by the BMC.

13. The system according to claim 1, wherein the gating switch is configured for connecting two PCIe buses of a CPU of the two CPUs of the server which operates currently to the baseboard management control apparatus and the USB controller respectively.

14. The system according to claim 1, wherein the baseboard management control apparatus is configured for providing a verified startup program for a CPU during a startup phase of the server.

15. The system according to claim 1, wherein the first USB interface is an interface of a USB2.0 protocol.

16. A server, comprising the server management system according to claim 1.

17. The server according to claim 16, wherein two PCIe bus at each of the two CPUs of the server are connected to the server management system.

18. The server according to claim 16, wherein channels of four PCIe buses at the two CPUs of the server are uniformly controlled by the gating switch in the server management system.

19. The server according to claim 16, wherein a CPU of the two CPUs of the server sends a PCIe signal through a PCIe bus connected to the baseboard management control apparatus in the server management system.

20. The server according to claim 19, wherein the PCIe signal comprises data related to an operating system interface, the data is configured for display control on the operating system interface by the baseboard management control apparatus.

* * * * *